United States Patent [19]

Hirama et al.

[11] Patent Number: 4,781,199
[45] Date of Patent: Nov. 1, 1988

[54] SYSTEM AND METHOD FOR MEASURING SOUND VELOCITY OF INTERNAL TISSUE IN AN OBJECT BEING INVESTIGATED

[75] Inventors: Makoto Hirama, Otawara; Yoichi Sumino, Tochigi, both of Japan

[73] Assignee: Kabushiki Kaisha Toshiba, Kanagawa, Japan

[21] Appl. No.: 816,902

[22] Filed: Jan. 7, 1986

[30] Foreign Application Priority Data

Jan. 7, 1985 [JP] Japan .................................... 60-241
Aug. 22, 1985 [JP] Japan .................................. 60-183053

[51] Int. Cl.⁴ ............................................. A61B 10/00
[52] U.S. Cl. ............................... 128/660.01; 73/597; 73/626
[58] Field of Search .............................. 128/660–661; 73/597–598, 626

[56] References Cited

U.S. PATENT DOCUMENTS

| | | | |
|---|---|---|---|
| 4,176,658 | 12/1979 | Kossoff et al. | 73/597 X |
| 4,452,081 | 6/1984 | Seppi | 128/660 X |
| 4,566,459 | 1/1986 | Umemura et al. | 73/597 X |
| 4,625,555 | 12/1986 | Fujii | 128/660 X |
| 4,653,505 | 3/1987 | Iinuma | 128/660 |
| 4,669,482 | 6/1987 | Ophir | 128/660 |

Primary Examiner—Francis J. Jaworski
Attorney, Agent, or Firm—Finnegan, Henderson, Farabow, Garrett and Dunner

[57] ABSTRACT

A system and method for measuring the sound velocity of the internal tissue within an object to be investigated. First and second pulses of ultrasonic energy are transmitted along a common, steered transmitting beam into the object by a first subarray of transducer elements that are a distinct part of an array of transducer elements. The echoes of the first and second pulses return to the transducer array along a first and a second parallel steered receiving beams, activated by a second and third subarrays of transducer. The system measures the propagation times for the first and second pulses to leave and return to the array. The average sound velocity of the internal tissue of the object can be determined from the measured propagation times and the known geometric characteristics of the array, subarray, and steered angles, without the measurement being adversely affected by a fat or muscle layer covering the internal tissue.

10 Claims, 5 Drawing Sheets

SYSTEM AND METHOD FOR MEASURING SOUND VELOCITY OF INTERNAL TISSUE IN AN OBJECT BEING INVESTIGATED

BACKGROUND OF THE INVENTION

1. Field of the Invention

This invention relates to a system and method for examining tissue of an object to be investigated and is especially directed to in vivo measurement of the sound velocity of the tissue. Through such measurement, the user of the system and method can determine the nature of the tissue and often perform medical or scientific diagnosis.

2. Description of the Prior Art

Nishimura N. et al., "Measurement of Sound Velocity as a Diagnostic Tool Diffuse Liver Diseases," Japanese Journal of Medical Ultrasonics, 44-B-5, May 1984 shows a technique of measuring sound velocity of liver with two single transducers disposed at both ends of a linear array transducer. These two single transducers are disposed so that their beams cross within the liver. An ultrasonic pulse and its echo propagate from one single transducer through that cross point and to the other transducer. The propagation time taken by the pulse to travel that path is measured. The average sound velocity through the propagation path is computed from the propagation time, the distance between the two transducers, and the angles of propagation defined by the placement of the transducers. In this past technique, however, it is difficult to examine an internal tissue. Such an internal tissue, such as a liver, lies under a fat or muscle layer near the skin surface. The sound velocity is slower in the fat layer and faster in the muscle layer than it is in the liver. Therefore the propagation time taken by the pulse to travel that path depends on the thickness of the fat or muscle layer. This fat or muscle layer sometimes has a uniform thickness and sometimes has a nonuniform one. Because of this problem, it is difficult to obtain an accurate measurement of the sound velocity of the internal tissue.

SUMMARY OF THE INVENTION

It is an object of the present invention to provide a system and method for measuring the sound velocity of the internal tissue of an object using an ultrasonic beam transmitted from an ultrasonic transducer array.

It is another object of the present invention to provide a system and method for measuring the sound velocity of the internal tissue of the object by cancelling the effect of a fat or muscle layer covering it.

It is a further object of the present invention to provide a system and method for measuring accurately the sound velocity of the internal tissue covered by a fat or muscle layer of uniform thickness.

It is still a further object of the present invention to provide a system and method for measuring accurately the sound velocity of the internal tissue covered by a fat or muscle layer of nonuniform thickness.

Additional objects and advantages of the invention will be set forth in part in the description which follows, and in part will be obvious from the description, or may be learned by practice of the invention. The object and advantages may be realized and attained by means of the elements and combinations particularly pointed out in the appended claims.

To achieve the objects and in accordance with the purpose of the invention, as embodied and broadly described herein, the system of this invention includes a system for measuring the sound velocity of an inner tissue body within an object to be investigated, the system comprising an array of transducer elements spaced at predetermined intervals for transmitting pulses into the object and receiving echoes of said pulses reflected from said object, the array including at least three subarrays of transducers that are separate from one another by predetermined distances; transmitting means coupled with the array for exciting a first subarray of transducers to direct first and second pulses toward the object along a common transmitting beam; receiving means coupled with the array for activating a second subarray and third subarray of transducers different from those activated by the transmitting means to receive echoes of the first and second pulses along a first receiving beam and a second receiving beam, respectively, the first and second receiving beams being parallel to each other; beam steering means coupled with at least one subarray for activating transducers of that subarray at predetermined time delays to steer at least one of the transmitting beam and receiving beams so that the transmitting beam and first receiving beam intersect at point Po within the inner tissue and the transmitting beam and second receiving beam intersect at different point $P_1$ within the inner tissue; time measuring means coupled with the subarrays for measuring the propagation time taken for a particular pulse to travel along the intersecting transmitting and receiving beams to and from the phased array and for thereby determining a first propagation time for the first pair of intersecting beams and a second propagation time for the second pair of intersecting beams; and computing means coupled with the time measuring means for determining the sound velocity of the inner body tissue from the time difference between the first and second propagation times.

The method of the present invention includes a method for measuring the sound velocity of an inner tissue body within an object to be investigated, the method comprising the steps of directing from a first predetermined position A a first and a separate second pulse toward the object along a common transmitting beam; receiving to a second predetermined position B the echos reflected from the object along a receiving beam steered to cross the path of said transmitting beam at a first intersection point P0 within the tissue of the inner tissue; receiving to a third predetermined position D the echos reflected from the object along a second receiving beam steered in parallel to the first receiving beam to cross the path of the transmitting beam at a second intersection point Pl within the tissue of the inner tissue body; measuring a first propagation time taken for the first pulse to travel from position A to position B; measuring a second propagation time taken for the second pulse to travel from position A to position D; and computing the sound velocity of the inner body tissue from the first and second propagation times, the relative positions of the subarrays A, B and D, and the steered angles of the transmitting beam and the receiving beams.

According to the present invention, the system and method of this invention permits an accurate measurement of the sound velocity of any internal tissue of an object, even if the internal tissue is covered by a thick fat or muscle layer of uniform or nonuniform thickness.

The system preferably includes an array of ultrasonic transducers which can provide a B-mode image of the object. In addition, the array of ultrasonic transducers of this invention provides a first ultrasonic transmitting beam, a first ultrasonic receiving beam, and a second ultrasonic receiving beam that is parallel with the first ultrasonic receiving beam. Both of the first and second ultrasonic receiving beams intersect with the first ultrasonic transmitting beam at first and second points, respectively, within the internal tissue.

A first and second set of ultrasonic pulses are transmitted along the first ultrasonic transmitting beam from a first subarray of ultrasonic transducers, that subarray being a part of the total array of transducers. The echoes of the first set of pulses, reflected and scattered at the first point, are received by a second subarray of the total array of ultrasonic transducers. This second subarray is another part of the array and is spaced apart from the first subarray by a predetermined distance. The echoes of the second set of pulses, reflected and scattered at the second point, are received by a third subarray of the total array of ultrasonic transducers. This third subarray is another part of the array and is spaced apart from the first and second subarray by predetermined distances. One of the second and third subarrays lies between the first subarray and the other subarray. Both, or at least one, of the ultrasonic transmitting beams and the ultrasonic receiving beams are steered so that they intersect at first and second points located within the internal tissue.

The system measures the time periods from the transmissions of the first and second ultrasonic pulses by the first subarray to the receptions of the echoes of the first and second pulses by the second and third subarrays, respectively. The path lengths along which the first and second pulses and their echoes propagate are geometrically defined by the distance between the first and second subarrays, the distance between the first and third subarrays, and the steering angles of all the ultrasonic transmitting and receiving beams. The differences between the path lengths and between the time periods of the first and second pulses eliminate the effect of the fat or muscle layer covering the internal tissue. As described below, the average sound velocity of the internal tissue is obtained by dividing the difference of the path lengths by the difference of time periods.

The above system and method accurately measures the sound velocity of an internal tissue covered by a fat or muscle layer of a uniform thickness. At times, however, an internal tissue is covered by a fat or muscle layer of a nonuniform thickness. In this case, the system further utilizes a fourth subarray of transducers located between the first subarray and at least one of the second and third subarray. The fourth subarray transmits a second set of ultrasonic pulses along a second ultrasonic transmitting beam. The echoes of these pulses are received by the farther located one of the second and third subarrays along its respective ultrasonic receiving beam. Particularly, the first subarray and the farther located one of the second and third subarrays are disposed symmetrically to a center axis of the array, and their beams intersect at a point on the center axis. The fourth subarray and the remaining subarray are also disposed symmetrically to the center axis. Therefore, three sets of beam paths defined by these four beams are disposed symmetrically to a center axis, if the medium through which the pulse and echo travels is homogeneous. The system of the present invention measures three sets of time periods which correspond to the three different pulses that travel along the three sets of beam paths. Through these measurements, it is possible to obtain a pair of time differences between the time periods. One is the time difference between (1) the time period from the transmission by the first subarray to the reception by the symmetrically located one of the second and third subarray and (2) the time period from the transmission by the first subarray to the reception by the other of the second and third subarray. The other is the time difference between (1) the time period from the transmission by the first subarray to the reception by the symmetrically located one of the second and third subarray and (2) the time period from the transmission by the fourth subarray to the reception by the one subarray symmetrically located with the first subarray. The pair of the time periods are averaged. The average sound velocity of the internal tissue is obtained by dividing the difference between the path lengths by the averaged time periods. In the alternative, two different average sound velocities are obtained from the pair of the time periods, after that they are averaged, to obtain the practical sound velocity. In either way, the effect of the fat or muscle layer is cancelled, and the average sound velocity of the internal tissue is therefore obtained.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings.

Figure 1:
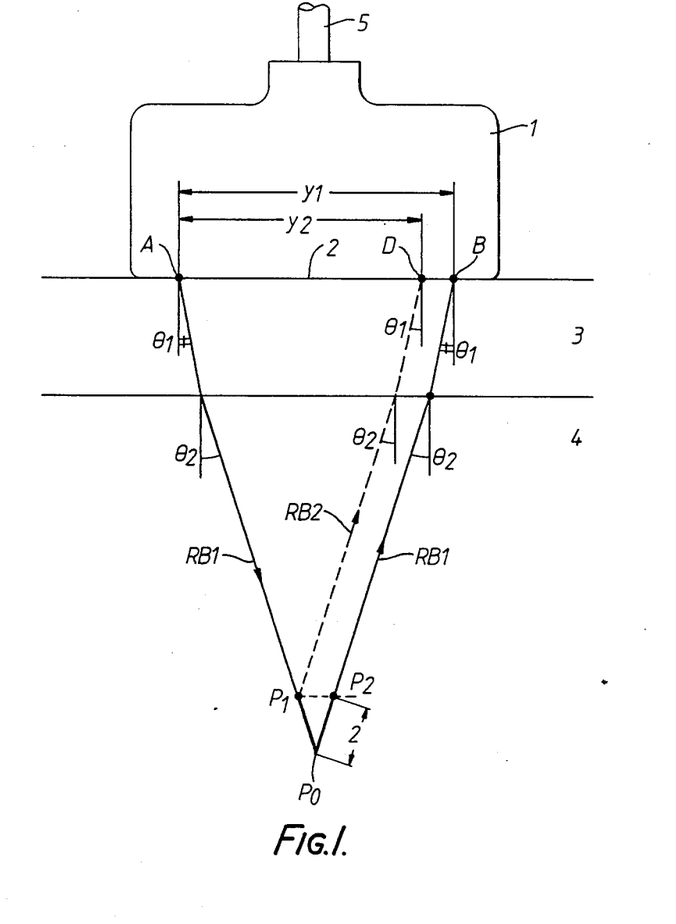
FIG. 1 is a schematic diagram showing an array of transducers of the present invention generally and illustrating the basic principle of the present invention.

FIG. 1 is explanatory of the basic principle applied by the present invention. In FIG. 1 an ultrasonic transducer 1 is connected to a transmitter and receiver (not shown) through a cable 5. The ultrasonic transducer 1 includes an array of ultrasonic transducer elements provided in its bottom surface 2. In use, the bottom surface 2 of transducer 1 is placed on a surface of an object to be investigated. The transducer 1 transmits ultrasonic pulses into the object and receives echoes of the pulses that return from the object.

The object to be investigated includes a fat or muscle layer 3 underneath its skin surface. For the purpose of this illustration, it is assumed that this fat or muscle layer 3 lies in a uniform thickness over the internal tissue 4, such as a liver. It is already known that sound velocity is slower (about 1400 m/sec) in a fat layer and faster (about 1600 m/sec) in a muscle layer than it is in the internal tissue 4 of the liver. It is medically significant to measure the sound velocity of the liver in order to determine whether it is abnormal or not.

The transducer of the present embodiment preforms two kinds of scanning. One is the well-known B-mode scanning which displays a tomogram of the object under investigation. In the B-mode scanning, for example, a plurality of parallel beams are scanned in a plane within the object. Echoes received along these parallel beams are modulated into brightness according to their intensities. The distributions of the brightness on a video display provide a tomographic image of the object. These parallel beams can be sequentially scanned in the same plane to obtain the tomographic image in real time. When a B-mode image is used with the present invention, the resultant tomographic image preferably is frozen on a monitor so that the image can be referenced during the measurement of sound velocity.

The other form of scanning performed by the present invention is beam scanning which is taken to measure the sound velocity of tissue within the object. In this scanning, first ultrasonic pulses are transmitted from position A at one end of the array toward a point $P_1$ along a steered transmitting beam TB1. The transmitting beam TB1 is steered at an angle $\theta_1$ and deflected at an angle $\theta_2$ at the boundary of the fat or muscle layer 3 and the internal tissue 4. This deflection occurs because of the difference of the sound velocity between the fat or muscle layer and the internal tissue, and the deflection is defined by Snell's law. The difference between the angles $\theta_1$ and $\theta_2$ is a few degress when the angle $\theta_1$ is about 13.5 degrees. Some of the echoes of the first pulses that are scattered from point $P_0$ are received at position B at the other end of the transducer array. Position B is located at distance $y_1$ from the position A. The echoes travel along a steered receiving beam RB1 which crosses with beam TB1 at the point $P_0$. This receiving beam RB1 is steered at the angle $\theta_1$ and also is deflected at the angle $\theta_2$ at the boundary of the fat or muscle layer 3 and internal tissue 4, in a manner similar to the transmitting beam RB1.

Next, second ultrasonic pulses are transmitted along the transmitting beam TB1 from the position A toward a point $P_1$ which is nearer the surface than the point $P_0$. Some of the echoes of the second pulses are scattered and reflected around the point $P_1$ and are received at position D of the transducer. This position D is located at a distance $y_2$ from the position A, the distance $y_2$ being shorter than the distance $y1$. The echoes travel along another steered receiving beam RB2 which is parallel to the beam RB1 in both the tissue 4 and layer 3.

The difference L between the length of path A-$P_0$-B of the first pulses and path A-$P_1$-D is geometrically defined as follows:

$$L = (y_1 - y_2)/\sin\theta_2 \qquad (1)$$

Usually it is difficult to measure accurately angle $\theta_1$ because $C_1$, the velocity of sound in the fat or muscle layer, is unknown. But the transducer 1 is designed to transmit and receive these pulses at an angle $\theta_0$ into water the sound velocity of which is well-known. Usually a wave is deflected when it travels from a certain medium into another medium having a different density. Therefore the following relation is derived from Snell's law:

$$\sin\theta_0/C_0 = \sin\theta_1/C_1 = \sin\theta_2/C_2 \qquad (2)$$

where $C_0$, $C_1$ and $C_2$ are the sound velocities in water, the fat or muscle layer 3, and the internal tissue 4, respectively. The sound velocity $C_2$ can be described as follows:

$$C_2 = L/\Delta T \qquad (3)$$

where L is the length of the difference between the paths A-$P_0$-B and A-$P_1$-D, and $\Delta T$ is the time difference between the time periods the first and second pulses take to propagate along their respective paths.

The sound velocity $C_2$ of the internal tissue 4 is obtained from equations (1), (2) and (3) as follows:

$$C_2 = \sqrt{C_0(y_1 - y_2)/\Delta T \sin\theta_0} \qquad (4)$$

Thus $C_2$ can be obtained from known values $C_0$, $y_1$, $y_2$, $\Delta T$, and $\theta_0$, even if $C_1$ or the thickness of the layer 3 is unknown.

This method of the present invention uses one transmission beam TB1 and two parallel receiving beams RB1 and RB2. Of course, the method can also use two parallel transmitting beams and one receiving beam. Moreover, if the steering angles of beams TB1 and RB1 are not the same, the equation defining the average velocity $C_2$ would be different but could be readily derived from known geometric relationships.

Figure 2:
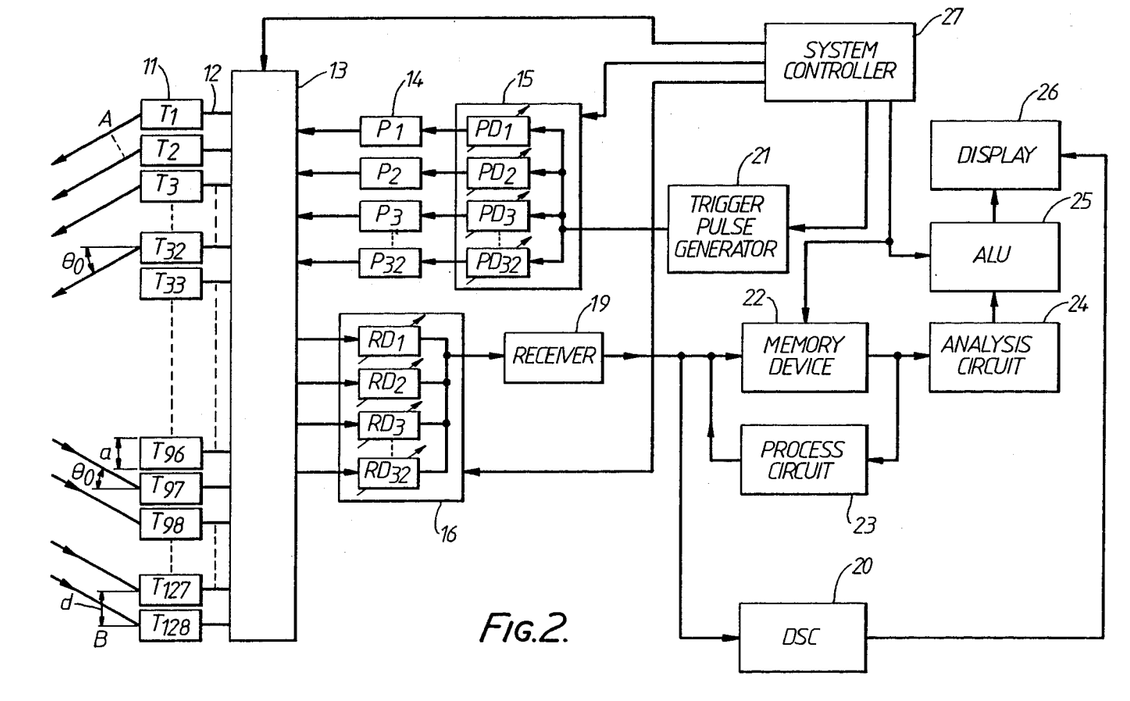
FIG. 2 is a block diagram illustrating an embodiment of an apparatus of the present invention.

A preferred embodiment of the present invention is shown in FIG. 2. In FIG. 2, an array of ultrasonic transducer elements 11 is arranged in the bottom surface 2 of the ultrasonic transducer 1. In the particular embodiment shown, the array 11 includes 128 transducer elements (T1 and T128). Each of the transducer elements is capable of transmitting an ultrasonic pulse when voltage is supplied to it and converting received echoes of pulses into electrical signals. In the preferred embodiment, these elements (T1 to T128) have a width of 0.45 mm and are juxtaposed in a row at an interval d of 0.5 mm. The voltages supplied to some of the elements (T1 to T128) and electrical signals converted by them are transmitted and received, respectively, through cables 12 which are connected to them. A trigger pulse generator 21 generates 3.75 MHz trigger pulses responsive of 4 KHz rate pulses provided from a system controller 27. In the preferred embodiment, these trigger pulses are supplied to 32 transmitting delay lines 15. These delay lines 15 produce trigger pulses of delay times to steer the ultrasonic transmitting beam along a preselected steering angle. In the preferred embodiment, delay line 15 can produce variable delay times to thereby change the steered angle as desired. Moreover, delay lines 15 can also provide the transducers with delay times that focus the transmitted beam electronically at a given target within the internal tissue to be investigated.

In the preferred embodiment, the delayed trigger pulses are supplied to 32 pulsers 14. The pulsers 14 generate high voltage pulses to excite the transducer elements. Outputs of these pulsers 14 are supplied to multiplexer 13 which in turn selects, for example, the elements T1 to T32 at the position A and connects pulsers 14 to them. The elements T1 to T32 are then excited with the delayed high voltage pulses and produce the desired ultrasonic pulses. The phased array 11 contacts with the surface of the object to be investigated through a coating material (not shown), and the desired ultrasonic pulses and resultant steered beam generated by the elements are transmitted into the object.

The delayed time $\tau_0$ between adjacent elements is defined by the following equation:

$$\tau_0 = (d/C_0) \cdot \sin \theta_0 \qquad (5)$$

where $\theta_0$ is the desired transmitting angle, d is the distance between adjacent transducers, and $C_0$ is the average sound velocity of normal tissue, which is approximately equal to that water, i.e. 1530 m/s. To steer the beams at an angle $\theta$, the delay lines 15 are set so that each element is driven by the delayed time difference $\tau_0$. Thus, the pulse delay signals PD1=0, PD2=$\tau_0$, PD3=2$\tau_0$, ..., and PD32=31$\tau_0$ are given to the respective delay lines 15 as delayed times. The ultrasonic pulses produced by these delayed time differences propagate along an ultrasonic transmitting beam steered at angle $\theta_0$.

After the ultrasonic pulses are sent toward the object, the multiplexer 13 in the preferred embodiment selects, for example, 32 elements T97 to T128 at the position B or elements T81 to T112 at the position D and connects them to receiving delay lines 16. Echo signals received by the elements T97 to T128 are delayed in the same manner as the transmitted signals. Thus, echo delay times of the receiving transducers are given as RD1=31$\tau_0$, RD2=30$\tau_0$, ... and RD32=0. These delayed echo signals are then summed up and supplied to receiver 19. By applying the delay time, the elements T97 to T128 or T81 to T112 receive echoes in direction $\theta_1$.

The receiver 19 amplifies and detects the summed echo signals and provides the signals in digital form to memory device 22 and DSC (digital scan converter) 20. The digital signals are stored in the memory device 22. The memory device 22 determines what address to store the data in accordance with the time of a $-10$ MHz clock pulse provided from the system controller 27 which also serves as a trigger of the rate pulse. Therefore, the measuring resolution of the embodiment shown in FIG. 2 is 100 n sec.

Since these signals contains speckle noise, it is difficult to determine their peak. Process circuit 23 averages 32 signals through the same path to obtain a smooth envelope of them. The peak value of the stored digital signals received by the second subarray or third subarray and stored by the memory device represents the echo reflected at the point P$_1$ or P$_2$. Wave analysis circuit 24 detects time, i.e. address, of the peak in the memory device 22. The time period from the transmission of pulses to this peak is the propagation time. In this way two different propagation times are obtained. One is through the path A-P$_0$-B and the other is through the path A-P$_1$-D. ALU (Arithmetic Logic Unit) 25 calculates the difference of propagation times $\Delta T$.

The equation (4) is rewritten from equation (5) as follows;

$$C_2 = \sqrt{d(y_1 - y_2)/\Delta T \tau_0} \qquad (6)$$

the values of d, (y$_1$-y$_2$), and $\tau_0$ are known, and the value of $\Delta T$ is measured by the present invention. Therefore ALU 25 also computes the sound velocity C$_2$ from these known values and then displays the computed value of C$_2$ on display 26.

When the present invention is used in B-mode scanning, the multiplexer 13 causes a subarray in the array to transmit pulses and receive their echoes along the same beam axes. These echo signals from the receiver 19 are stored on locations in a frame memory of DSC 20. The data in DSC 20 can be placed in a TV format to display a tomographic image on the display 26. In the preferred embodiment, a frozen tomogram is displayed from the information on the frame memory so that the tomogram can be reviewed at the same time the system is used to measure the sound velocity of tissue.

Figure 3:
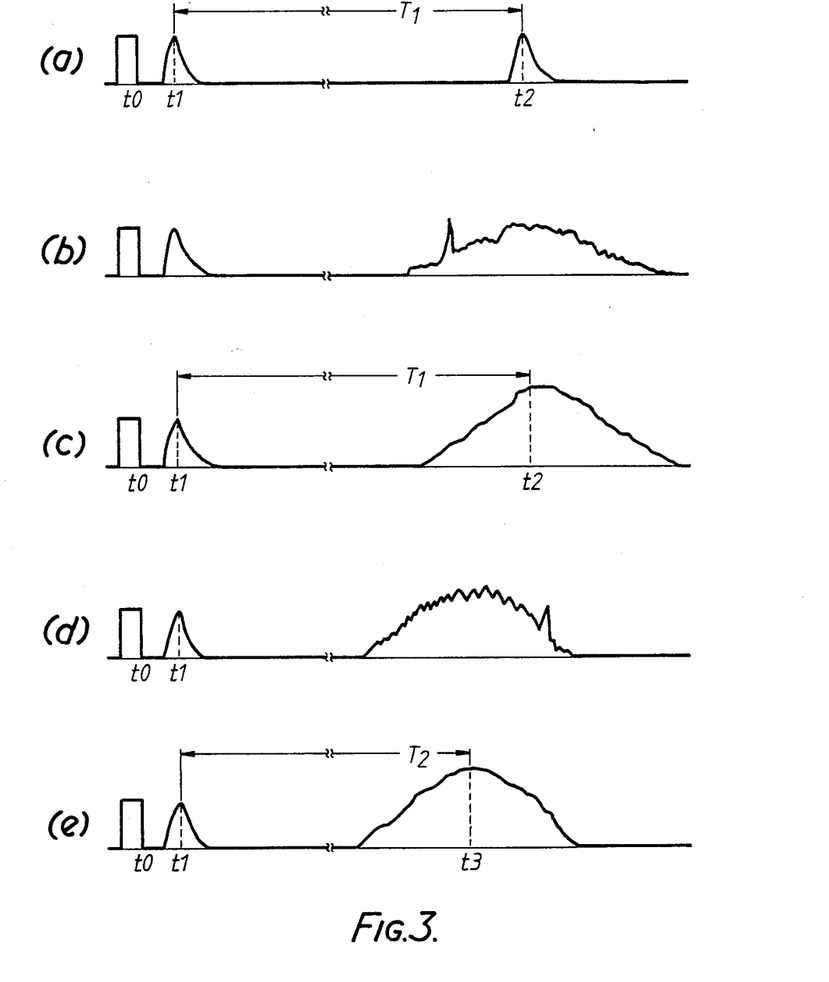
FIGS. 3(a)–3(b) are timing charts illustrating the transmission and reception of pulses by the first, second, and third subarrays, respectively, and showing graphically the time period measured by the embodiment shown in FIG. 2.

FIG. 3 shows a timing chart illustrating the transmission and reception of pulses by respective subarrays and showing graphically the time period measured by the present invention. The ultrasonic pulse transmitted by the subarray at point A peaks at time t1 which is slightly after the time when the beam is initially pulsed.

In circumstances where there is a point reflector P1 or P2 at the intersection point of the respective ultrasonic transmitting beam and the ultrasonic receiving beam, the system will detect a fairly distinct echo signal which has a peak at t2, as shown in FIG. 3(a). In that circumstance, the propagation time T1 is obtained as the interval between times t1 and t2. When investigating a particular object, it may be possible to adjust the ultrasonic transducer so that the two beams intersect at a natural point reflector, such as a blood vessel in the liver. Generally, however, it is difficult to find such a point reflector during a clinical measurement. As described below, the present invention can measure the sound velocity of tissue in an object, even if there is no point reflector within the object. For example, when a liver is examined, the intersection of the two beams may be surrounded by uniform liver tissue. The beams each would have some width and would not intersect at a distinct point. Accordingly, the echoes would reflect from the liver tissue at the cross section defined by the intersecting widths of the two beams. In this case, as shown in FIG. 3(b), the waveform of echoes would be scattered and uneven since they are received as a number of successive signals. Therefore, it is difficult to detect the peak. One manner of overcoming this difficulty is to sum the echoes in order to obtain a smoothed envelope. It is further preferable to shift the position of the point P0 slightly, take several readings around point P0 and average the results. The resultant curve would then look like that shown in FIG. 3(c). In all cases, the propagation time T1 is represented as $T1 = t2 - t1$.

In the same way as previously described, the subarray at the position A transmits another beam of pulses along the transmitting beam TB1 and toward the point P$_1$ which is shallower in depth than the point P$_0$. Echoes as shown in FIG. 3(d) are reflected or scattered around the point P$_1$ and are received by the subarray at the position D which is located nearer point A than the position B by the distance (y1-y2). The echoes are received along the receiving beam RB2 in parallel with the receiving beam RB1. These echo signals obtained by the subarray are processed as shown in FIG. 3(e) to detect time t3 which corresponds to the peak of the received echos. Thus, another propagation time T2 is obtained as $T2=t3-t1$.

In the preferred embodiment of the present invention, the memory 22 has two regions for storing the echo signals of the paths A-Po-B and A-P1-D, respectively. The system controller 21 controls the system to transmit the pulses and receive their echoes, traveling the paths A-Po-B and A-P1-D alternatively. After 32 alternate transmissions and receptions of each path, each propagation time is computed by the ALU 25 to obtain the sound velocity C2 of the internal tissue. Such alternative transmissions and receptions of each path are preferable since the object being examined normally is moving slightly.

It is expected that the same result will be obtained if the ultrasonic pulses are transmitted from the subarrays at the position D and or B and echoes of the pulses are received by the subarray A.

Figure 4:
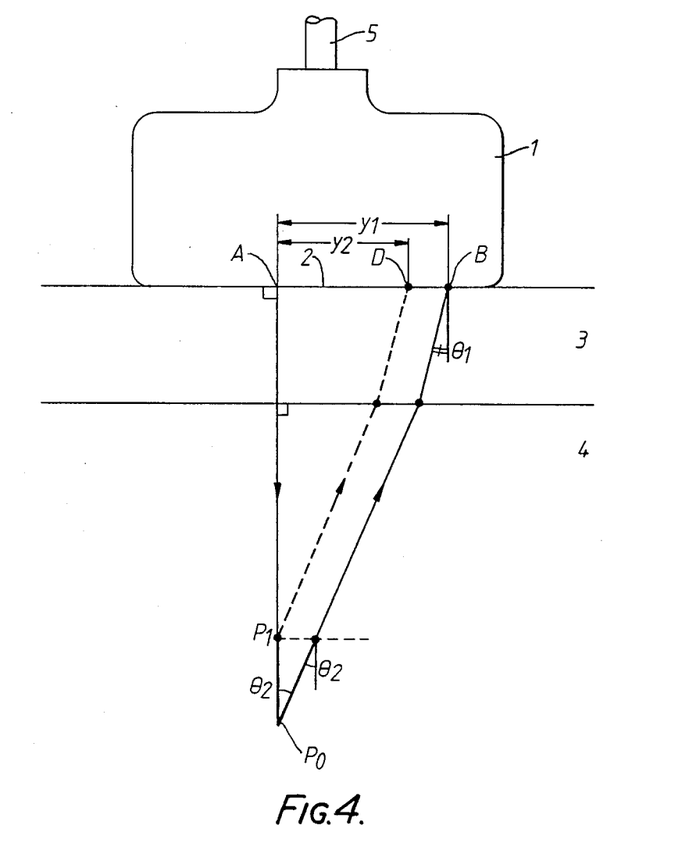
FIG. 4 is a schematic diagram illustrating the beam paths of another embodiment of the present invention.

FIG. 4 illustrates another embodiment according to the present invention. In this embodiment the system controller does not supply the delay times to steer the transmitting beam TB1 to the delay lines 15. Instead, as shown in FIG. 4, subarray at position A directs pulses perpendicular to the surface 2. Echoes of the pulses are reflected or scattered at point Po or P1 and are received by transducer subarrays at position B or D along receiving beam RB1 or RB2, respectively. Each propagation time is obtained in the same way as the aforementioned embodiment.

The difference L between paths A-Po-B and A-P1-D is geometrically defined as follows:

$$L = \frac{y1 - y2}{\sin\theta 2} + \frac{y1 - y2}{\tan\theta 2} \quad (2)$$

From equation (2), equation (7) is rewritten as follows:

$$L = (y1 - y2)\frac{1 + \sqrt{1 - \left(\frac{C2}{Co}\sin\theta o\right)^2}}{\frac{C2}{Co}\sin\theta o} \quad (8)$$

The difference between the propagation times $\Delta T$ is described as follows:

$$\Delta T = L/C2 \quad (9)$$

L of equation (8) is substitated for equation (9) as follows:

$$[\Delta T^2 \sin^2\theta o \, C2^2 - (2(y1-y2).Co \, \Delta T \sin\theta o - (y1+Y2)^2.\sin^2\theta o)] \, C2^2 = 0 \quad (10)$$

Since $C2>0$, C2 is obtained as follows:

$$L = \frac{y1 - y2}{\sin\theta 2} + \frac{y1 - y2}{\tan\theta 2} \quad (2)$$

So the AIU 25 calculates the sound velocity C2 according to the equation (11). The values Co, y1, y2, and $\theta$o are known, and the value of $\Delta T$ is obtained from the system, as previously described. In this embodiment of the present invention, the delay lines 15 can operate without the large delay elements for steering beam TB1.

Figure 5:
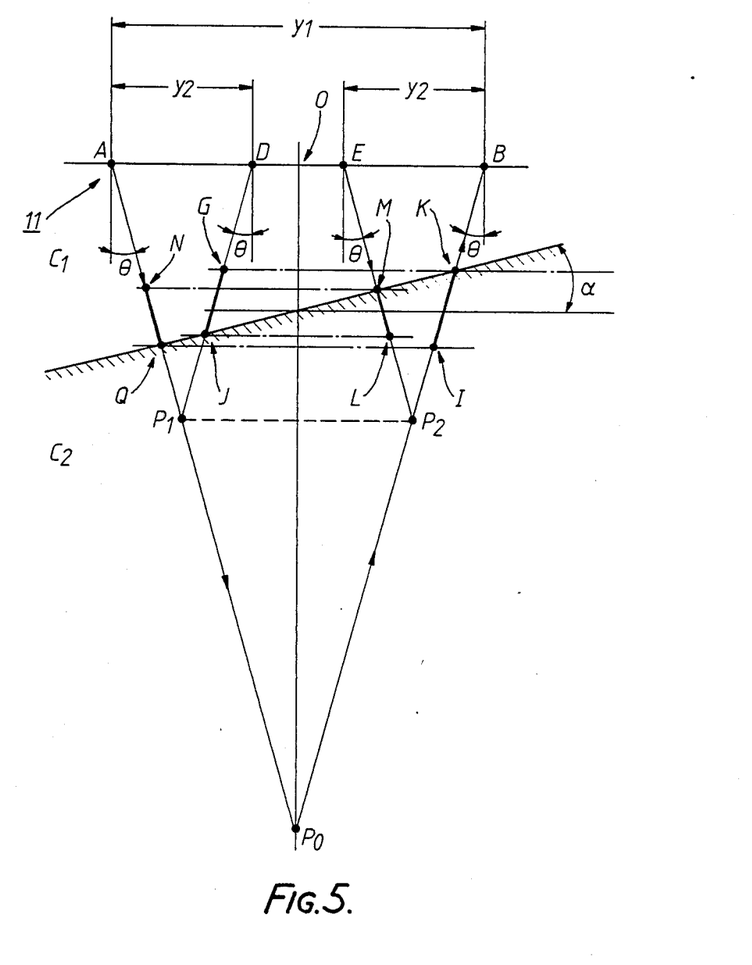
FIG. 5 is a schematic diagram illustrating the principles of the present invention applied to measure the sound velocity of an internal tissue covered by a fat or muscle layer of a nonuniform thickness.

FIG. 5 illustrates another embodiment which is capable of measuring sound velocity in an internal tissue covered with a fat or muscle layer of a nonuniform thickness. Usually such a layer can be generalized as a layer which declines at an angle $\alpha$ as shown in FIG. 5.

In this embodiment of the present invention, a subarray at a position A directs first pulses towards a point Po along a transmitting beam TB1 at an angle $\theta$. Echoes of the pulses, reflected or scattered around the point Po, are received along a receiving beam RB1 at an angle $\theta$ by a subarray located at position B at distance y1 from the position A. The subarray at the position A directs second pulses toward a point P1. Echoes of these pulses, reflected or scattered around the position P1, are received along a receiving beam RB2 at an angle $\theta$ by a subarray located at a position D at distance y2 from position A. A subarray of transducers located at position E which is a distance y2 from the position B directs third pulses toward a point P2 along a transmitting beam TB2 at an angle $\theta$. Echoes of these pulses, reflected or scattered around the position P2, are received along the receiving beam RB1 at the angle $\theta$ by the subarray at position B. If the deflections of the transmitting beams TB1, TB2 and the receiving beams RB1, RB2 due to the difference of densities between the fat or muscle layer 3 and the internal tissue 4 are neglected, the beams TB1 and RB1 and the beams RB2 and TB2 are symmetric to an axis through the point Po as shown in FIG. 5. The positions A and B and the positions D and E are also symmetric to the axis.

By the same way as the aforementioned embodiment, the average sound velocity C through the path P1-Po-P2 is obtained from the difference time $\Delta T$ between the propagation times T1 and T2 of the first and second pulses according to the following equation:

$$C = \sqrt{\frac{(Y1 - Y2)Co}{\Delta T \sin\theta o}} \quad (12)$$

where $\Delta T = T1 - T2$.

However, in the paths A-Po-B and A-P1-D the propagation time of the first pulses travelling the path I-K by the sound velocity C2 is different from that of the second pulses travelling the path J-G by the sound velocity C1 since the fat or muscle layer is declined at the angle $\alpha$. Therefore the average sound velocity C includes error due to the difference of these propagation times as described as follows:

$$\Delta T = t1 - t2 = t(P1PoP2) + \left(\frac{1}{C2} - \frac{1}{C1}\right)IK \quad (13)$$

where t(P1PoP2) represents the time of the ultrasonic pulse travelling the path P1-Po-P2 and the length $\overline{IK}$ is equal to the length The error is the second term of the equation (13). The IK is geometrically given as follows:

$$IK = \frac{(y1 - y2)\tan\alpha}{1 + \tan\alpha \cdot \tan\theta} \cdot \frac{1}{\cos\theta} \quad (14)$$

The bigger the angle $\alpha$ is, the larger the error.

In this embodiment of the present invention, another difference time $\Delta T'$ of the propagation times of the first pulses and the third pulses is obtained as follows:

$$\Delta T = T1 - T3 \quad (15)$$
$$= T(P1P_oP2) + \left(\frac{1}{C1} - \frac{1}{C2}\right)NQ$$

where the length $\overline{NQ}$ is equal to the length $\overline{ML}$. And $\overline{NQ}$ is written as follows:

$$NQ = \frac{(y1 - y2)\tan\alpha}{1 - \tan\alpha \cdot \tan\theta} \cdot \frac{1}{\cos\theta} \quad (16)$$

The averaged difference time $\Delta T$ of $\Delta T$ and $\Delta T'$ is defined as follows:

$$\Delta T = \frac{\Delta T + \Delta T'}{2} \quad (17)$$
$$= t(P1P_oP2) + \frac{1}{2}\left(\frac{1}{C1} - \frac{1}{C2}\right)(IK - NQ)$$

Now if $1 < \tan\alpha\tan\theta$, the length $\overline{IK}$ and $\overline{NQ}$ is rewritten from the equations (14) and (16) as follows:

$$IK \approx (y1-y2)\tan\alpha/\cos\theta \quad (18)$$

$$NQ \approx (y1-y2)\tan\alpha/\cos\theta \quad (29)$$

From equations (17), (18) and (19) the error term of the equation (17) is cancelled. Therefore, the accurate sound velocity C2 of the internal tissue 4 is obtained by calculating the following equation:

$$C2 = \sqrt{\frac{(Y1 - Y2)C_o}{\Delta T \sin\theta_o}} \quad (20)$$

Or by using equation (5)

$$= \sqrt{\frac{(Y1 - Y2) \cdot d}{\Delta T \cdot \tau_{to}}} \quad (21)$$

In the above embodiment, the deflection of the ultrasonic wave at the boundary between the fat or muscle layer and the internal tissue is neglected. The inventors of the present invention verified that the equation (20) or (21) gave an accurate result by simulation test taking the effect of such deflection into consideration. For example, in case that y1=57.6 mm, y2=17.28 mm, C1=1430 m/sec, $\theta=12.5°$ and $\alpha=20°$, the error $\epsilon$, from the equation (12) using the propagation times of the first and second pulses travelling the paths A-Po-B and A-P1-D is given as follows:

$$\epsilon 1 = \frac{C - C2}{C2} \times 100 = -0.63\% \quad (22)$$

In the same way the error $\epsilon_2$ using the propagation times of the first and third pulses travelling the paths A-Po-B and E-P2-B is given as follows:

$$\epsilon 1 = \frac{C - C2}{C2} \times 100 = -0.63\% \quad (22)$$

To the contrary, in this embodiment of the present invention error $\epsilon_3$ is given as follows:

$$\epsilon_3 = \frac{C - C2}{C2} \times 100 = 0.065\% \quad (24)$$

Thus, even if such deflection is taken into consideration, the error is small enough to diagnose the internal tissue accurately.

Referring to the system shown in FIG. 2, the apparatus of this embodiment will be described. The system controller 27 controls the multiplexer 13 to connect the pulsers 14 to transducers T1 to T32, T1 to T32 and T64 to T95 consecutively in order to direct the first and second pulses along the transmitting beam TB1 and the third pulses along the transmitting beam TB2. The controller 27 controls the multiplexer 13 to connect the delay lines 16 to transducers T97 to T128, T33 to T64 and T97 to T128 in order to receive the echoes of the first pulses along the receiving beam RB1, the echoes of the second pulses along the receiving beam RB2, and the echoes of the third pulses along the receiving beam RB1. The memory 22 has three regions to store from the receiver 19 the echo signals of the first to third pulses respectively. The processor 23 averages each of the echo signals to obtain smooth envelopes of them. The analysis circuit 24 detects the peaks of each envelope to determine the propagation times of the first to third pulses. The ALU then calculates the average sound velocity through the path P1-Po-P2 according to the equation (20) or (21).

It is preferable that the path P1-Po-P2 is long, since measurement error of propagation time is smaller than that of a short path. It is necessary to get three kinds of propagation times of the paths A-Po-B, A-P1-D and E-P2-B, but the order or direction of these pulses is not significant in the present invention.

Moreover, the delayed time between adjacent transducers can be replaced by the delayed time $\tau(x)$ defined as follows:

$$\tau(x) = \frac{F}{C_o}\sqrt{1 + \left(\frac{x}{F}\right)^2 + 2\left(\frac{x}{F}\right)\sin\theta_o} - 1 \quad (25)$$

Where x is a location or coordinate in the array of the transducer to be excited and F is a focal distance from the array. If the focal distance F is set to the distance from the array to the point Po, P1 or P2, the peak of the echo signals is keen or sharp since the area where transmitting and receiving beams intersect is smaller.

It will be apparent to those skilled in the art that various modifications and variations can be made in the practice of the present invention without departing from the scope or spirit of the invention. It is intended that the specification and examples be considered as exemplary only, with the true scope and spirit of the invention being defined by the following claims.

What is claimed is:

1. A system for measuring the sound velocity of an inner tissue body within an object to be investigated, the system comprising:

an integral array of transducer elements spaced at predetermined intervals for transmitting ultrasonic pulses from the surface of the object into the object and receiving echoes of said pulses reflected from within said object, said array including at least three subarrays of transducers that are separated from one another by predetermined distances;

transmitting means coupled with said array for exciting a first subarray of transducers to direct first and second ultrasonic pulses toward the object along a common transmitting beam;

receiving means coupled with said array for activating a second subarray and third subarray of transducers different from those activated by the transmitting means to receive echoes of said first and second pulses along a first receiving beam and a second receiving beam, respectively, said first and second receiving beams being parallel to each other;

beam steering means coupled with at least one of said at least three subarrays for activating transducers of that subarray at predetermined time delays to steer at least one of said transmitting beam and receiving beams so that the transmitting beam and the first receiving beam intersect at point Po within the inner tissue body and the transmitting and the second receiving beam intersect at different point $P_1$ within the inner tissue body;

time measuring means coupled with said subarrays for measuring the propagation time taken for a particular pulse to travel along the intersecting transmitting and receiving beams to and from the integral array and for thereby determining a first propagation time for the first pair of intersecting beams and a second propagation time for the second pair of intersecting beams; and computing means coupled with said beam steering means and said time measuring means for determining the sound velocity of the inner body tissue from the time difference between the first and second propagation time, the predetermined distances, and the angles of the transmitting and receiving beams.

2. The system of claim 1 wherein said beam steering means directs said first and second pulses along a first transmitting beam that is perpendicular to the array.

3. The system of claim 1 wherein said beam steering means directs the first transmitting beam at a predetermined angle to the array and further directs the first and second receiving beams at an angle which is the same as the predetermined angle.

4. The system of claim 3 wherein said computing means computes the second velocity C2 according to the following equation:

$$C2 = \sqrt{Co\,(y1 - y2)/\Delta T \sin\theta o}$$

wherein Co is sound velocity of water, y1 is a distance between the first subarray and the one of the second and third subarray which is farther from the first subarray, y2 is a distance between the first subarray and the other of the second and third subarray, $\Delta T$ is the difference in time between the first and second propagation times, and $\theta o$ is the angle of the transmitting beam to the array.

5. The system of claim 3 wherein said computing means computes the sound velocity C2 according to the following equation:

$$C2 = \sqrt{dx\,(y1 - y2)/\Delta T \cdot \tau o}$$

where y1 is a distance between the first subarray and the one of the second and third subarray which is farther from the first subarray, y2 is a distance between the first subarray and the other of the second and third subarray, $\Delta T$ is the difference in time between the first and second propagation times, $\tau o$ is the predetermined time delay used to steer beams, and d is the predetermined intervals between adjacent transducer elements of said array.

6. A system for measuring the sound velocity of an inner tissue body within an object to be investigated, the system comprising:

an integral array of transducer elements spaced at predetermined intervals for transmitting ultrasonic pulses from the surface of the object into the object and receiving echoes of said pulses reflected from within said object, said array including at least three subarrays of transducers that are separated from one another by predetermined distances;

transmitter means coupled with said array for exciting a first and second subarray of transducers to direct first and second ultrasonic pulses toward said object along a first transmitting beam and a second transmitting beam, respectively, said first and second transmitting beams being parallel to each other;

receiving means coupled with said array for activating a third subarray of transducers different than those activated by the transmitting means to receive echoes of said first and second pulses along a common first receiving beam;

beam steering means coupled with at least one of said at least three subarrays for activating transducers of that subarray at predetermined time delays to steer at least one of said transmitting beams and said receiving beam so that the first transmitting beam and the first receiving beam intersect at a point Po within the inner tissue body and the second transmitting beam and the first receiving beam intersect at a different point P1 within the inner tissue body;

time measuring means coupled with said subarrays for measuring the propagation time taken for a particular pulse to travel along the intersecting transmitting and receiving beams to and from the integral array and for thereby determining a first propagation time for the first pair of intersecting beams and a second propagation time for the second paid of intersecting beams; and computing means coupled with said beam steering means and said time measuring means for determining the sound velocity of the inner body tissue from the time difference between the first and second propagation times, the predetermined distances, and the angles of the transmitting and receiving beams.

7. A system for measuring the sound velocity of an inner tissue body within an object to be investigated, the system comprising:

an integral array of transducer elements spaced at predetermined intervals for transmitting ultrasonic pulses from the surface of the object into the object and receiving echoes of said pulses reflected from within said object, said array including at least four subarrays A, B, D, and E of transducers that are separated from one another by predetermined distances and are symmetrically arranged relative both to one another and to an axis of the array;

transmitter means coupled with said array for exciting a first subarray A of transducers to direct first and second ultrasonic pulses toward said object along a common first transmitting beam and for exciting a second subarray of transducers E to direct third ultrasonic pulses toward said object along a second transmitting beam;

receiving means coupled with said array for activating a third subarray B and a fourth subarray D of transducers each different from those activated by the transmitting means to receive echoes of said first and third pulses along a first receiving beam to subarray B and to receive echoes of said second pulses along a second receiving beam to subarray D, respectively;

beam steering means coupled with the first to the fourth subarrays for activating transducers of the subarrays at predetermined time delays to steer the first and second transmitting beams and the first and second receiving beams so that the first transmitting beam and the first receiving beam intersect at a point Po within the inner tissue and on said axis, the second transmitting beam and the second receiving beam intersect at a point P1 within the inner tissue, and the third transmitting beam and the first receiving beam intersect at a different point P2 which is within the inner tissue and is symmetrical with the point $P_1$ relative to said axis;

time measuring means coupled with said subarrays for measuring the propagation times taken for a particular pulse to travel along the intersecting transmitting and receiving beams to and from the integral array and for thereby determining a first propagation time for the first pair of beams a second propagation time for the second pair of beams, and a third propagation time for the third pair of beams; and computing means coupled with said beam steering means and said time measuring means for determining the sound velocity of the inner body tissue from the time differences between the measured propagation times, the predetermined distances, and the angles of the transmitting and receiving beams.

8. The system of claim 7 wherein said computing means calculates the sound velocity C2 according to the following equation:

wherein y1 is a distance between the subarrays A and B, y2 is a distance between the subarrays A and D and also is the distance between subarrays B and E, $\tau o$ is the predetermined time delay, d is the predetermined interval between adjacent elements, and $\Delta T$ is average of the differences in time between (1) the first and second propagation times and (2) the first and third propagation times.

9. A method for measuring the sound velocity of an inner tissue body within an object to be investigated, the method comprising the steps of:

preparing an integral array of transducer elements including a first predetermined position A, a second predetermined position B, and a third predetermined position D;

placing said integral array on the surface of the object;

directing from said first predetermined position A a first and a separate second pulse toward said object along a common transmitting beam;

receiving to said second predetermined position B the echoes reflected from within said object along a receiving beam steered to cross the path of said transmitting beam at a first intersection point PO within the inner tissue body;

receiving to said third predetermined position D the echoes reflected from within said object along a second receiving beam steered in parallel to said first receiving beam to cross the path of said transmitting beam at a second intersection point $P_1$ within the tissue of the inner tissue body;

measuring a first propagation time taken for the first pulse to travel from position A to position B;

measuring a second propagation time taken for the second pulse to travel from position A to position D; and computing the sound velocity of the inner body tissue from the first and second propagation times, the relative position of the subarrays A, B and D, and the steered angles of the transmitting and receiving beams.

10. A method for measuring the sound velocity of an inner tissue body within an object to be investigated, the method comprising the steps of:

preparing an integral array of transducer elements including a first transmitting position A, a second transmitting position E, a first receiving position B and a second receiving position D, the respective positions A and B and D and E being symmetrical to one another and to a central axis passing through the transducer array:

placing said integral array on the surface of the object;

directing a first steered transmitting beam from said first transmitting position A and a first steered receiving beam from said first receiving position B so that the pair of beams intersect at a point PO within the tissue body and on the central axis;

directing a second steered transmitting beam from said first transmitting position A on the same beam as the first transmitting beam and a second steered receiving beam, parallel with said first steered receiving beam, from said second receiving position D so that the pair of beams intersect at a point $P_1$ within the tissue body;

directing a third steered transmitting beam, parallel with said first steered transmitting beam, from said second transmitting position E and a third steered receiving beam from said first receiving position B so that the pair of beams intersect at a position P2 within the tissue body;

measuring a first propagation time taken for a pluse to travel from position A to position B;

measuring a second propagation time taken for a pulse to travel from position A to position D;

measuring a third propagation time taken for a pulse to travel from position E to B; and computing the sound velocity of the inner time body from the measured propagation times, the relative positions of subarrays A, B, D and E, and the steered angles of the transmitting beams and the receiving beams.

* * * * *